Patented May 25, 1948

2,441,951

UNITED STATES PATENT OFFICE 2,441,951

PRODUCTION OF ULTRAMARINE

Alling P. Beardsley, Plainfield, and Stanley H. Whiting, Martinsville, N. J., assignors to American Cyanamid Company, New York, N. Y., a corporation of Maine No Drawing. Application July 24, 1945, Serial No. 606,887

8 Claims. (Cl. 106—305)

This invention relates to the production of ultramarine in a two-step process, and more particularly to improvements in the oxidation of primary ultramarine to secondary ultramarine.

Modern high strength, high sulfur ultramarine is usually produced in a single operation in which a high sulfur ultramarine raw mix is charged into crucibles of ceramic material of controlled porosity, fired to produce primary ultramarine blue of low strength and brightness, and then permitted to cool gradually over a very extended period, during which cooling a certain amount of air passes through the porous ceramic containers and oxidizes the primary ultramarine to the strong brilliant secondary ultramarine of commerce. This reaction is accompanied by a loss of from about one-seventh to one-eighth of the combined sodium in the primary ultramarine, which is transformed into sodium sulfate.

In our copending application Serial No. 606,888, filed July 24, 1945, we have described and claimed a two-step process in which the production of primary and secondary ultramarine is effected in two separate steps, the first step being carried out with substantial exclusion of reactive gases, such as carbon dioxide, water vapor, and particularly oxygen, from the ultramarine charge, followed by an oxidation process under conditions providing for satisfactory contact of oxygen with the primary ultramarine at an elevated temperature to effect oxidation to the secondary ultramarine. Our two step process results in the production of a much higher strength ultramarine of better shade and permits a very marked reduction in the time cycle. However, even in our two-step process the oxidation step is difficult to control. It is well known that the oxidation is critical. If insufficient oxygen or oxidizing agent contacts the primary ultramarine it is not fully oxidized to secondary ultramarine, and there is therefore present much weak and dull blue material. On the other hand, too much oxygen results in over-oxidation, producing a white or gray product which is useless.

In the single operation process in standard commercial use the steps are compromises. The porosity of the ceramic containers is selected such that the amount of damage caused by reactive furnace gases in the first step is not too great, while sufficient oxygen can diffuse through the container walls to oxidize practically most of the primary ultramarine in the second stage. This method of oxidizing, however, is a compromise which results in a non-uniform oxidation of the ultramarine in any one crucible. Oxygen enters only through the porous wall of the crucible, and therefore the outer layers of the primary ultramarine receive maximum oxidation which decreases toward the center of the crucible. As a result the outside layers of the charge may be somewhat overoxidized, with the production of a certain amount of white or gray material, the bulk of the charge is more or less correctly oxidized to secondary ultramarine, and a portion of the center of the charge may be under-oxidized and therefore retains a considerable amount of primary ultramarine which is both weak and dull.

The oxidation step in the two-step process of our copending application referred to above permits better control because this step can be carried out under conditions best suited, particularly as to temperature, for most complete oxidation to the desired shade of blue. Nevertheless even in our two-step process it is very difficult, in fact impossible, to completely control the oxidation so that no over-oxidation or under-oxidation results. The product obtained, therefore, while of greatly improved strength shade and uniformity, is still frequently not perfect.

The present invention is concerned with an improvement in the oxidation step, whether this is in a conventional furnace where the so-called single operation process is carried out, or whether it is in a two-step process. The novel feature of the present invention is the use of sulfur dioxide as an oxidizing gas instead of oxygen. Sulfur dioxide is ordinarily not considered as an oxidizing agent. However, in the second step of the ultramarine process we have found that it does act as an oxidizer by a reaction involving in the overall the transformation of sulfur dioxide into sulfur and oxygen. While this is the overall result, it is probable that free oxygen is not formed at any time and that the oxidizing effect takes place through a more complicated chain of reactions. Almost nothing is known of the exact chemical reactions which take place in the transformation of primary ultramarine into secondary ultramarine, but we believe that when sulfur dioxide is used as an oxidizing agent there is at no time any considerable amount of free oxygen present.

The sulfur dioxide used in the present invention has a very important characteristic. It permits complete oxidation of primary ultramarine to secondary ultramarine, but no matter how much sulfur dioxide is present it does not have a sufficiently high oxidation potential to over-oxidize the secondary ultramarine to the white or gray product which results from over-oxidation in the presence of free oxygen. It is thus possible to carry out the oxidation step without any careful control of the amount of sulfur dioxide, and as it is no longer necessary to restrict the amount, the two-step process of our copending application above referred to may be carried out without the use of containers of controlled porosity in the second step. In other words, the ultramarine can be treated in bulk and a large surface contacted with sulfur dioxide without any danger of over-oxidation. This permits a drastic reduction of the time required in the second or oxidation step. While maximum efficiency is obtained when the sulfur dioxide oxidation is employed in conjunction with our two-step process referred to above, the same advantage as far as quality can be obtained in a single operation process, but the reduction in time is not possible, as the sulfur dioxide has to pass in slowly through the porous crucible walls.

The present invention is concerned with a process in which sulfur dioxide is used as the oxidation agent throughout substantially the whole of the oxidation step. It is particularly important that it be used for the latter part of the oxidation because this is the time when over-oxidation results with oxygen. In normal ultramarine manufacture sulfur dioxide is present during the first part of the oxidation step. There is always present an excess of sulfur in the charge above that entering into the structure of the secondary ultramarine. This excess is transformed for the most part into polysulfides, which are then transformed into sulfur dioxide and sulfates by oxidation. When the oxidation step first starts in an ultramarine furnace there is considerable evolution of sulfur dioxide from this cause, which becomes small after a day or so, when most of the sulfur has been burned out. In the light of our present knowledge, derived from the development of the present invention, it seems probable that there is some oxidation of primary ultramarine by means of sulfur dioxide in the initial phase of the oxidation step in standard ultramarine manufacture. However, evolution of the sulfur dioxide soon practically ceases. It is not possible to end the ordinary oxidation step while an atmosphere of sulfur dioxide still surrounds the charge. If this is done it will be found that most of the charge is under-oxidized, and therefore commercially valueless. When the procedure of the present invention is followed, sulfur dioxide is the oxidizing agent throughout the whole oxidation step and is of particular importance in the later stages where over-oxidation is most likely to occur with oxygen as the oxidizing agent. It is therefore possible to carry out the ordinary single operation process of standard ultramarine manufacture by permitting oxidation with oxygen at the beginning of the oxidation step, and turning to sulfur dioxide as soon as evolution of sulfur dioxide has slowed down. This procedure permits obtaining part of the advantages with respect to high quality but it does not permit economies which are possible when sulfur dioxide is used as the only oxidizing agent in suitable apparatus, as will be described below. Such a combined procedure is therefore included in the broader aspects of the present invention, but is not preferred.

It is an advantage of this invention that the temperature range for the sulfur dioxide reaction is not critical. Temperatures of about 200°–550° C. are satisfactory, but I prefer to use a temperature of about 400°–466° C.

It might be thought at first examination that the use of sulfur dioxide instead of oxygen as an oxidizing agent would increase the cost of the process, and though the increased cost might be justified by improved quality and yield, it would still be an off-setting disadvantage. Actually, however, it is possible to operate with lower costs because the sulfur dioxide is transformed into sulfur in vapor form which can be recovered from the exit gases. In addition to the sulfur which is produced from sulfur dioxide, all of the sulfur present in sodium polysulfides is vaporized except the one atom per molecule still retained in the sodium sulfate which is formed. The total sulfur can be recovered from the exit gases by suitable cooling, and as much as necessary can then be re-used leaving the excess as a credit. In contrast in the process using oxygen as an oxidizing agent the excess sulfur of the charge passes off as sulfur dioxide, which is not only lost because it is too dilute for profitable recovery, but causes a serious nuisance to the surrounding community.

Because of the feasibility of exposing a large surface of the primary ultramarine to the sulfur dioxide it is possible to drastically cut down the time cycle, which reduces the fixed cost of the process because of greatly increased output per unit volume of apparatus. It is thus possible to obtain improved quality, almost complete uniformity of product, and at the same time to actually effect operating economies. It is rare in a chemical process to obtain advantages all along the line. Usually an improvement in one respect results in a disadvantage in another respect, since most processes are compromises.

When we speak of the use of sulfur dioxide, we do not mean that a gas consisting entirely of sulfur dioxide must be supplied. Such a gas may be used, but it is equally satisfactory to use a mixture of sulfur dioxide and an inert gas, nitrogen being the preferred diluent. A mixture of nitrogen and sulfur dioxide containing as little as 5% of sulfur dioxide may be used, but naturally the oxidation operation will take more time. A very satisfactory mixture is that made by converting all of the oxygen of air to sulfur dioxide, such a mixture approximating 20% of sulfur dioxide and 80% of nitrogen.

As already explained, sulfur is produced in the action of sulfur dioxide upon primary ultramarine. This sulfur must be swept out of the container as a vapor in order not to be left as a contaminant of the ultramarine. If undiluted sulfur dioxide is used as the oxidizing agent, considerably more must be supplied than is necessary merely for oxidation, the excess serving as a carrier gas for the sulfur vapor. The excess can be recovered after condensation of the sulfur vapor by cooling, and re-used. However, if diluted sulfur dioxide is used, the nitrogen serves as the carrier gas and only a slight excess of sulfur dioxide above that required for oxidation need be supplied. The sulfur dioxide is therefore preferably accompanied by an inert gas, which in practice is usually nitrogen. The gases which we do not wish to have present in more than traces are oxygen, water vapor, and acid gases such as sulfur trioxide or sulfuric acid. Carbon dioxide does not seem to have a harmful effect upon primary ultramarine, once the latter is fully formed.

The process of the present invention should not be confused with an experiment which was made by Ritter in 1860, in which Ritter treated a low-sulfur product which was almost white, and which he called white ultramarine, with sulfur dioxide. He got a product of a dirty greenish-blue color "which has little similarity to the characteristic color of ultramarine." He concludes "(1) that the action of sulfur dioxide upon white ultramarine removes a portion of the sodium which had hitherto formed a part of the structure, (2) that the body formed by this removal of sodium is not blue ultramarine, (3) that blue ultramarine is formed from the preceding body only when oxygen from the air combines with it." Ritter abandoned the attempt to use sulfur dioxide and decided to use chlorine as an oxidizing agent.

The invention will be described in greater detail in conjunction with specific examples, which illustrate a typical operation. In Example 2 the formation of the charge into briquettes is a process which is the subject of our copending application, Serial No. 606,886, filed July 24, 1945.

Throughout the specification and claims the term "primary ultramarine" will be used to cover the product obtained in the first firing stage up to about 760° C. before oxidation. The ultramarine produced in the first stage and which is referred to as primary ultramarine is a blue pigment although dull and of no strength. The contents of a crucible appear green because the blue primary ultramarine is mixed physically with yellow sodium polysulfides formed in the firing. Similarly in the specification and claims the terms "secondary ultramarine" will be used to cover the blue pigment obtained by oxidation of the primary ultramarine. The two terms above defined will be used in no other sense.

*Example I*

A mix was made of the following composition:

| | Parts |
|---|---|
| Calcined china clay | 822 |
| Diatomite | 112 |
| Soda ash | 743 |
| Sulfur | 665 |
| Rosin | 60 |

The mix was ground for four hours in a pebble mill loaded with pebbles of about ¾" dia. The ground mix was formed into briquets cold by pressure. (The process of briquetting ultramarine raw mix is claimed by our copending application, Serial No. 606,886, filed July 24, 1945.) The briquets were loaded into fused silica containers. The containers were heated to a temperature of about 720–760° C. during a period of 6 hours and held there for 4 to 5 hours. The containers were cooled, the briquets removed and cracked into smaller pieces and the pieces loaded into a fused silica container fitted for the passage of gas through it. While the container was being heated to about 400° C., nitrogen was passed through the charge to displace air. At 400° C, nitrogen was replaced by sulfur dioxide which was passed through for about 4 hours. The temperature during the passage of sulfur dioxide rose as high as 466°. After cooling, the charge was washed, ground wet in a pebble mill loaded with pebbles of ¼" to ⅜" size and dried. The strength of the product was found to be 1.90 times that of the strongest product made in plant operation in the usual type of furnace at the same period.

*Example II*

A mix was made of the following composition:

| | Parts |
|---|---|
| Calcined clay | 822 |
| Diatomite | 112 |
| Soda ash | 743 |
| Rosin | 30 |
| Charcoal | 30 |
| Sulfur | 665 |

This was ground in a pebble mill containing pebbles of about ¾" dia. The ground mix was briquetted cold by pressure, the briquets placed in an impervious fused silica container, heated to a temperature of 720° C. during six hours and held there four hours. After cooling, the briquets were removed, cracked, and transferred to another fused silica container in which they were heated to a temperature of about 420° while sulfur dioxide was supplied to them. After oxidation was completed, the blue was washed, wet-ground in a pebble mill with pebbles of about ¼" to ⅜" dia., and tested for strength. The strength was found to be 200% of the average blue of the highest strength, being made in the factory at the same period in the usual single operation.

In the examples there have been described processes in which the primary ultramarine is oxidized with sulfur dioxide without a substantial change of the chemical constitution of the primary ultramarine prior to oxidation. This is the preferred process for large scale commercial operation under industrial conditions obtaining in the United States. It is possible, however, to leach the primary ultramarine with water to remove soluble polysulfides and then subject the leached primary ultramarine to oxidation with sulfur dioxide. The same uniformly high quality ultramarine is produced but the savings realizable by recovering and reusing the polysulfides leached from the primary ultramarine are insufficient to make this process economically desirable in the United States. Such processes in which the primary ultramarine is first subjected to treatments for removing soluble constituents are included in the broader aspects of the present invention, although not preferred under present industrial conditions in the United States.

In the claims, the phrase "high sulfur 'secondary ultramarine'" is intended to describe an ultramarine blue containing at least 10% of combined sulfur.

We claim:

1. In a process of producing high sulfur "secondary ultramarine" containing at least 10% of combined sulfur by a process in which "primary ultramarine" is first produced and is then oxidized to "secondary ultramarine," the improvement which comprises carrying out at least the major and later portion of the oxidation of the "primary ultramarine" by means of sulfur dioxide as an oxidizing agent in the absence of substantial quantities of oxygen, water vapor and strongly acid gases.

2. In a process of producing high sulfur "secondary ultramarine" containing at least 10% of combined sulfur by a process in which "primary ultramarine" is first produced and is then oxidized to "secondary ultramarine," the improvement which comprises carrying out the whole of the oxidation of the "primary ultramarine" by means of sulfur dioxide as an oxidizing agent in the absence of substantial quantities of oxygen.

3. A method according to claim 1 in which the operations of producing "primary ultramarine" and oxidizing to "secondary ultramarine" are carried out in two separate steps with intermediate cooling, the ultramarine raw materials in the first step being kept out of contact with reactive gases during the formation of the "primary ultramarine," and the second step of oxidation of the "primary ultramarine" to "secondary ultramarine" being effected by contact of the "primary ultramarine" with the sulfur dioxide.

4. A method according to claim 2 in which the operations of producing "primary ultramarine" and oxidizing to "secondary ultramarine" are carried out in two separate steps with intermediate cooling, the ultramarine raw materials in the first step being kept out of contact with reactive gases during the formation of the "primary ultramarine," and the second step of oxidation of the "primary ultramarine" to "secondary ultramarine" being effected by contact of the "primary ultramarine" with the sulfur dioxide.

5. A method according to claim 1 in which the sulfur dioxide is associated with sufficient inert gases to act as a carrier for sulfur vapor evolved.

6. A method according to claim 2 in which the sulfur dioxide is associated with sufficient inert gases to act as a carrier for sulfur vapor evolved.

7. A process according to claim 1 in which the oxidation of the "primary ultramarine" is effected at temperatures between 200–550° C.

8. A process according to claim 2 in which the oxidation of the primary ultramarine is effected at temperatures between 200–550° C.

ALLING P. BEARDSLEY.
STANLEY H. WHITING.

REFERENCES CITED

The following references are of record in the file of this patent:

FOREIGN PATENTS

| Number | Country | Date |
|---|---|---|
| 9,200 | Great Britain | 1890 |
| 6,959 | Great Britain | 1911 |
| 206,466 | Germany | Oct. 22, 1907 |

OTHER REFERENCES

Manufacture of Colors for Painting, by Riffault et al., 1874, pages 304, 305, 312.